(12) United States Patent
Shimizu et al.

(10) Patent No.: US 10,178,052 B2
(45) Date of Patent: Jan. 8, 2019

(54) PARALLEL INFORMATION PROCESSING APPARATUS METHOD OF DETERMINING COMMUNICATION PROTOCOL, AND MEDIUM

(71) Applicant: FUJITSU LIMITED, Kawasaki-shi, Kanagawa (JP)

(72) Inventors: Toshihiro Shimizu, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 15/259,113

(22) Filed: Sep. 8, 2016

(65) Prior Publication Data

US 2017/0085439 A1    Mar. 23, 2017

(30) Foreign Application Priority Data

Sep. 17, 2015   (JP) ................................. 2015-184436

(51) Int. Cl.
*H04B 1/69* (2011.01)
*H04B 1/713* (2011.01)
(Continued)

(52) U.S. Cl.
CPC .......... *H04L 49/351* (2013.01); *G06F 15/163* (2013.01); *H04B 1/713* (2013.01);
(Continued)

(58) Field of Classification Search
CPC ....... H04B 1/713; H04L 41/083; H04L 41/12; H04L 41/145; H04L 5/023
See application file for complete search history.

(56) References Cited

U.S. PATENT DOCUMENTS

| 5,142,686 A | 8/1992 | Hecht et al. |
| 2005/0147024 A1* | 7/2005 | Jung ...................... H04B 1/713 370/203 |

(Continued)

FOREIGN PATENT DOCUMENTS

JP    2013-025505    2/2013

OTHER PUBLICATIONS

Bao, Lichun, MALS: Multiple access scheduling based on latin squares, 2004, University of California, (Year: 2004).*

*Primary Examiner* — Nicholas R Taylor
*Assistant Examiner* — Ho T Shiu
(74) *Attorney, Agent, or Firm* — Fujitsu Patent Center

(57) ABSTRACT

A parallel information processing apparatus includes a group of switches configured to have a topology of a Latin square, and nodes connected with a switch among the group of switches. The parallel information processing apparatus also include a memory and a processor configured to designate (n×k) units of blocks in the group of switches included in a lattice structure in the topology of the Latin square; to generate information about communication protocol that includes communication directions having different slopes for m (m≤k) units of the nodes, and the number of hops set for the respective communication directions having the different slopes; and to execute communication for the m units of the nodes of the units of the block, based on the information about communication protocol, so as to execute part-to-part communication between the m units of the nodes of the respective units of the blocks.

6 Claims, 19 Drawing Sheets

LATIN SQUARE Fat Tree

TWO-STAGE Fat Tree

(51) Int. Cl.
*H04L 12/24* (2006.01)
*H04L 12/931* (2013.01)
*G06F 15/163* (2006.01)
*H04L 12/933* (2013.01)

(52) U.S. Cl.
CPC .......... *H04L 41/083* (2013.01); *H04L 41/145* (2013.01); *H04L 49/1507* (2013.01)

(56) References Cited

U.S. PATENT DOCUMENTS

| | | | |
|---|---|---|---|
| 2005/0281317 A1* | 12/2005 | Oh | H04B 1/713 375/132 |
| 2013/0022047 A1 | 1/2013 | Nakashima et al. | |
| 2015/0092599 A1* | 4/2015 | Nakashima | H04L 41/12 370/254 |

* cited by examiner

LATIN SQUARE Fat Tree

TWO-STAGE Fat Tree

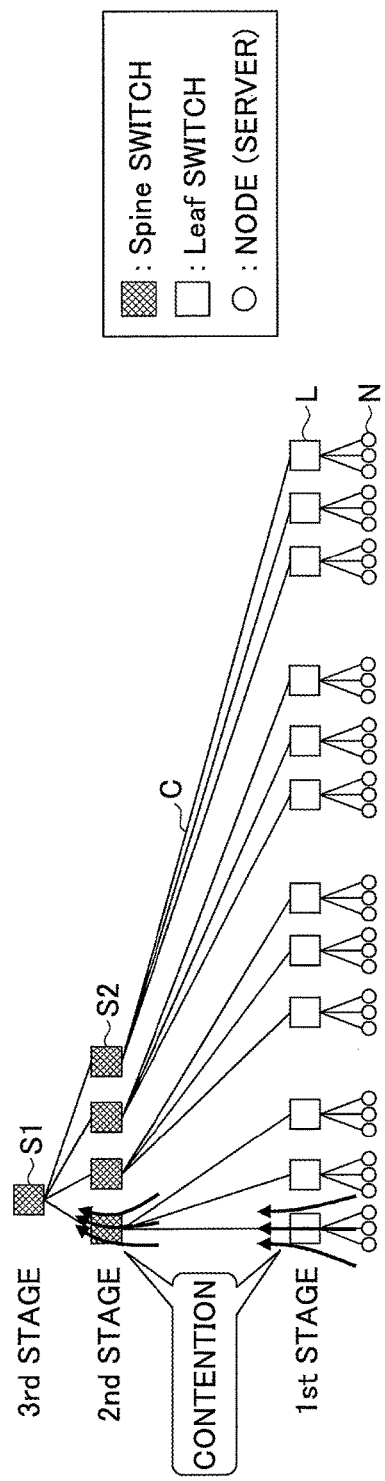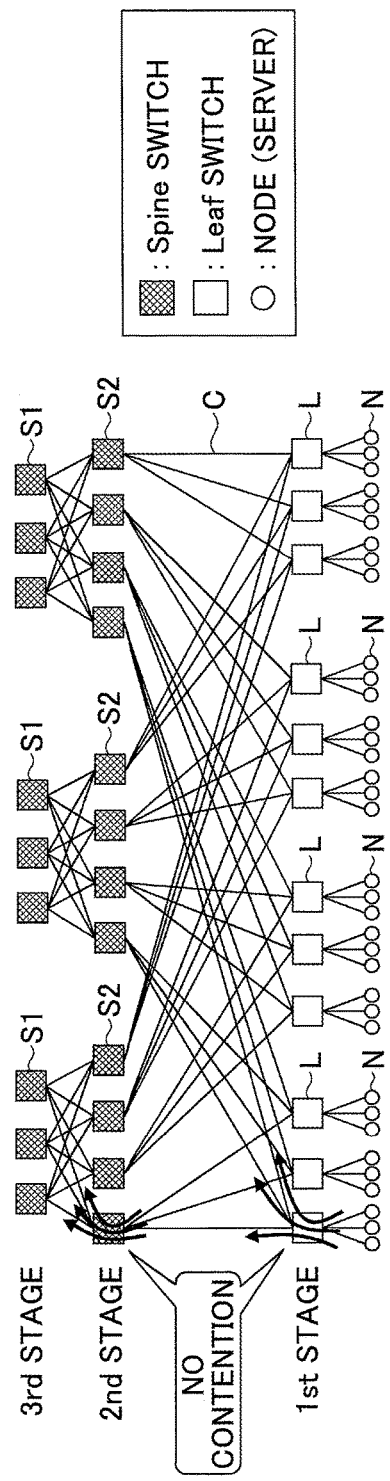

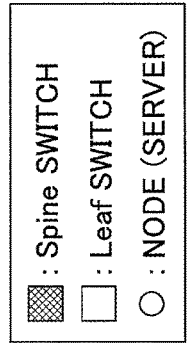
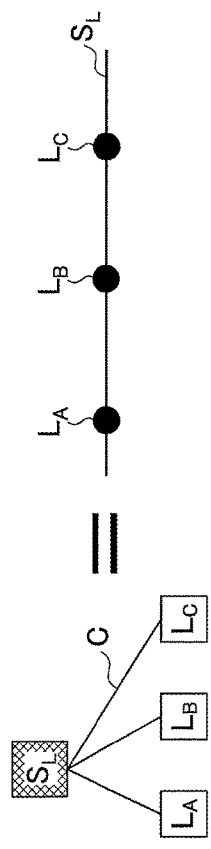
FIG.3A
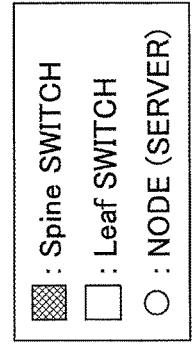
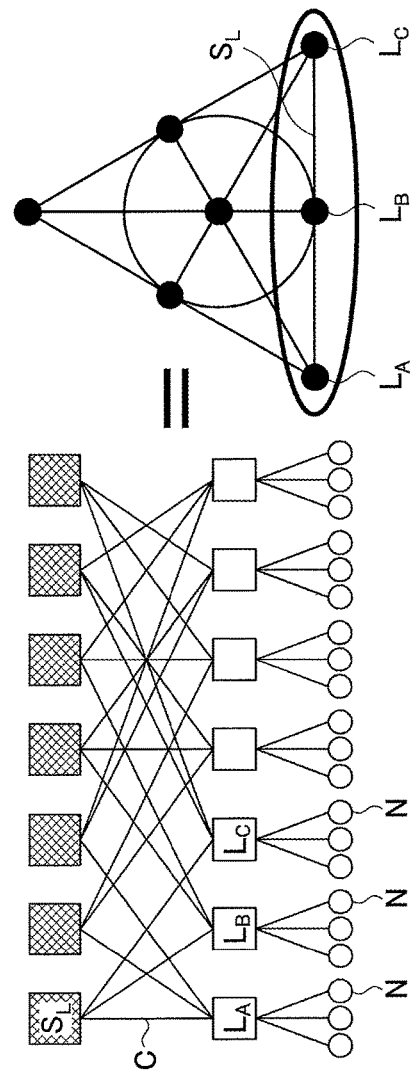
FIG.3B

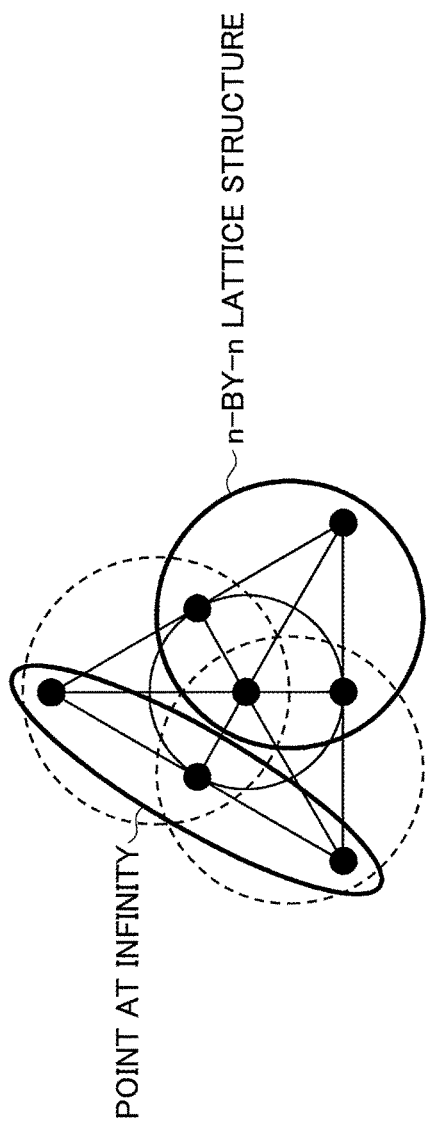

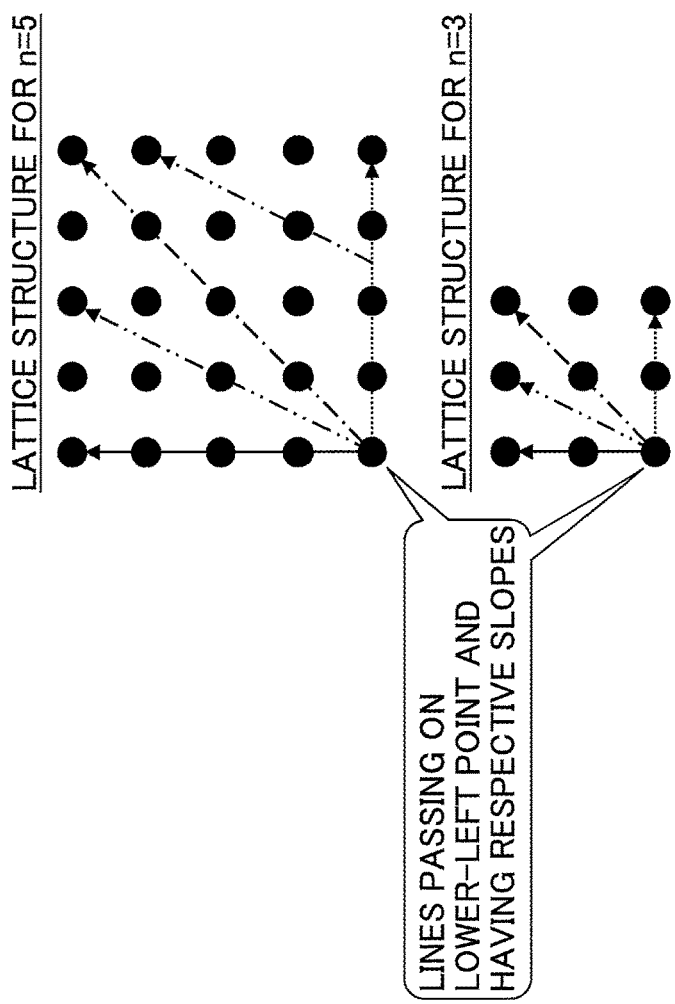

FIG.4B
LATTICE STRUCTURE FOR n=5
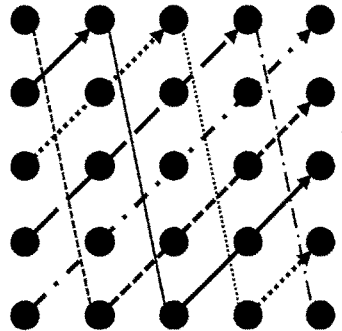
EXAMPLE OF PARALLEL LINES IN THE SAME DIRECTION (SLOPE 1)
LINES OF DIFFERENT LINE TYPES DO NOT CROSS
LATTICE STRUCTURE FOR n=3
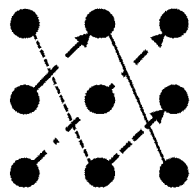

FIG.9A

| GROUP OF PHASES \ NODE ID | 0 | 1 |
|---|---|---|
| 0 | VERTICAL (2) | 1(1) |
| 1 | ... | ... |
| 2 | ... | ... |
| 3 | ... | ... |

FIG.9B

| GROUP OF PHASES \ NODE ID | 0 | 1 |
|---|---|---|
| 0 | VERTICAL (1) | 2(1) |
| 1 | VERTICAL (2) | SELF |
| 2 | 0(1) | VERTICAL (1) |
| 3 | 1(1) | VERTICAL (2) |
| 4 | 2(1) | 0(1) |
| 5 | SELF | 1(1) |

FIG.10

| Group of Phases | Phase | Serial Numbers of Phases | Node ID 0 | 1 | 2 | 3 | 4 | 5 | 6 | 7 | 8 | 9 | 10 | 11 |
|---|---|---|---|---|---|---|---|---|---|---|---|---|---|---|
| 0 | 0 | 0 | 4 | 11 | 6 | 9 | 8 | 3 | 10 | 1 | 0 | 7 | 2 | 5 |
| 0 | 1 | 1 | 5 | 10 | 7 | 8 | 9 | 2 | 11 | 0 | 1 | 6 | 3 | 4 |
| 1 | 0 | 2 | 8 | 1 | 10 | 3 | 0 | 5 | 2 | 7 | 4 | 9 | 6 | 11 |
| 1 | 1 | 3 | 9 | 0 | 11 | 2 | 1 | 4 | 3 | 6 | 5 | 8 | 7 | 10 |
| 2 | 0 | 4 | 2 | 5 | 0 | 7 | 6 | 9 | 4 | 11 | 10 | 1 | 8 | 3 |
| 2 | 1 | 5 | 3 | 4 | 1 | 6 | 7 | 8 | 5 | 10 | 11 | 0 | 9 | 2 |
| 3 | 0 | 6 | 6 | 9 | 4 | 11 | 10 | 1 | 8 | 3 | 2 | 5 | 0 | 7 |
| 3 | 1 | 7 | 7 | 8 | 5 | 10 | 11 | 0 | 9 | 2 | 3 | 4 | 1 | 6 |
| 4 | 0 | 8 | 10 | 3 | 8 | 1 | 2 | 7 | 0 | 5 | 6 | 11 | 4 | 9 |
| 4 | 1 | 9 | 11 | 2 | 9 | 0 | 3 | 6 | 1 | 4 | 7 | 10 | 5 | 8 |
| 5 | 0 | 10 | 0 | 7 | 2 | 5 | 4 | 11 | 6 | 9 | 8 | 3 | 10 | 1 |
| 5 | 1 | 11 | 1 | 6 | 3 | 4 | 5 | 10 | 7 | 8 | 9 | 2 | 11 | 0 |

| GROUP OF PHASES \ NODE ID | 0 | 1 |
|---|---|---|
| 0 | VERTICAL | 0 |
| 1 | VERTICAL | 1 |
| 2 | 2 | SELF |

A DIGIT (CHARACTER) APPEARS JUST ONCE IN ANY ROW

FIG.12A

| GROUP OF PHASES \ NODE ID | 0 | 1 |
|---|---|---|
| 0 | VERTICAL | 0 |
| 1 | VERTICAL | 1 |
| 2 | 2 | SELF |
| 3 | 0 | VERTICAL |
| 4 | 1 | VERTICAL |
| 5 | SELF | 2 |

A DIGIT (CHARACTER) APPEARS JUST ONCE IN ANY ROW

| DEGREE | DEGREE 4 | DEGREE 6 | DEGREE 8 |
|---|---|---|---|
| PARAMETERS (n,m,k) OF LATIN SQUARE | (3,2,2) | (5,3,2) | (7,3,3) |
| UNITS OF SELECTED SERVERS BY LATIN SQUARE | 12 | 30 | 63 |
| UNITS OF SELECTED SERVERS BY Fat Tree | 12 | 30 | 64 |
| UNITS OF SERVERS BY Fat Tree WITH RATIO ADJUSTMENT | 4 | 5 | 9 |
| UNITS OF CONNECTED SERVERS BY LATIN SQUARE | 52 | 186 | 456 |
| UNITS OF CONNECTED SERVERS BY Fat Tree | 16 | 36 | 64 | young
PARALLEL INFORMATION PROCESSING APPARATUS METHOD OF DETERMINING COMMUNICATION PROTOCOL, AND MEDIUM

CROSS-REFERENCE TO RELATED APPLICATIONS

This application is based upon and claims the benefit of priority of the prior Japanese Priority Application No. 2015-184436 filed on Sep. 17, 2015, the entire contents of which are hereby incorporated by reference.

FIELD

The following disclosure relates to a parallel information processing apparatus, a method of determining communication protocol, and a medium storing a program for determining communication protocol.

BACKGROUND

For a parallel distributed processing system in which multiples nodes (also referred to as "servers", below) execute calculation in parallel, a network management technology has been known that secures both wide bandwidth and low latency for signal transmission of all-to-all communication (see, for example, Patent Document 1).

RELATED-ART DOCUMENTS

Patent Documents

[Patent Document 1] Japanese Laid-open Patent Publication No. 2013-25505
[Patent Document 2] U.S. Pat. No. 5,142,686

However, if all-to-all communication is executed for all nodes in a parallel distributed process, problems may arise such that the cost becomes higher and/or the efficiency is decreased. To exchange data at a lower cost and more efficiently, the topological structure is important so that a greater number of nodes can be connected with a smaller number of switches.

SUMMARY

According to at least one embodiment of the present invention, a parallel information processing apparatus includes a group of switches configured to have a topology of a Latin square, and a plurality of nodes that are connected with a switch among the group of switches. The parallel information processing apparatus also includes a memory and a processor configured to designate (n×k) units of blocks in the group of switches included in a lattice structure in the topology of the Latin square; to generate information about communication protocol that includes communication directions having different slopes for m (m≤k) units of the nodes connected with the switches in the designated (n×k) units of the blocks, and the number of hops set for the respective communication directions having the different slopes; and to execute communication for the m units of the nodes of the (n×k) units of the blocks, based on the information about communication protocol, so as to execute part-to-part communication between the m units of the nodes of the respective (n×k) units of the blocks.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIGS. 2A-2B are diagrams that illustrate examples of cases where contention in all-to-all communication occurs and does not occur;
FIGS. 3A-3C are diagrams that illustrate the structure of a finite projective plane;
FIGS. 4A-4B are diagrams that illustrate examples of structures of Latin square fat trees according to an embodiment;
FIGS. 9A-9B are diagrams that illustrate examples of vector tables according to an embodiment;
FIG. 10 is a diagram that illustrates an example of a communication pattern table according to an embodiment;
FIGS. 12A-12B are diagrams that illustrate examples of vector tables according to a modified example of an embodiment;
FIG. 14 is a diagram that illustrates an example of evaluation of a method of determining communication protocol according to an embodiment.

DESCRIPTION OF EMBODIMENTS

In the following, an embodiment will be described with reference to the drawings. Note that elements having substantially the same functional configurations throughout the specification and drawings are assigned the same codes to avoid duplicated description.

Figure 1A:
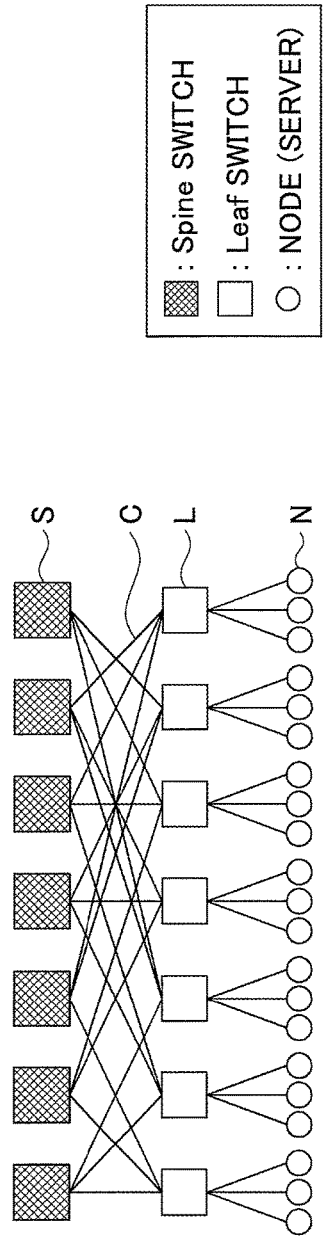
FIGS. 1A-1B are diagrams that illustrate examples of topological structures.
Figure 1B:
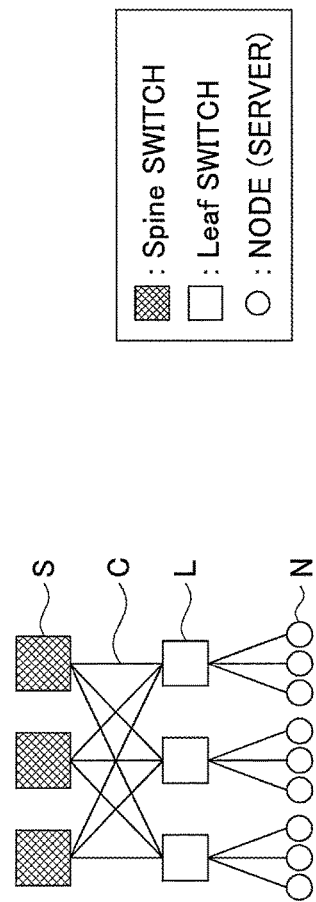

(Introduction)
In recent years, parallel distributed processing systems in which multiples nodes execute calculation in parallel (cluster systems) tend to become larger, and systems having a lot more nodes connected for parallel processing have become popular. As the topological structure to connect nodes, fat trees are widely used. For example, FIG. 1B illustrates an example of a fat tree having a two-stage configuration. A spine switch S is a switch connected with leaf switches L. A leaf switch L is a switch connected with nodes N (servers).

In a fat tree, each of the spine switches S is connected with all leaf switches L. For example, in the example of the two-stage fat tree in FIG. 1B, each of three spine switches S is connected with three leaf switches L. Also, each of the leaf switches L is connected with three nodes N.

In a tree structure in FIG. 2A, path contention occurs, for example, when information (messages) output from three nodes N connected with a leaf switch L is transmitted from the leaf switch L at the first-stage to a spine switch S2 at the second stage. Path contention also occurs when information is transmitted from a spine switch S2 at the second stage to a spine switch S1 at the third stage. In contrast to this, path contention does not occur in a fat tree structure in FIG. 2B because links C in the tree structure have a multiplexed structure. In other words, in the fat tree structure of FIG. 2B, all-to-all communication can be performed between the nodes without an occurrence of path contention. Note that "all-to-all communication" is communication in which all nodes N transmit/receive information with all nodes in a topology of a fat tree structure.

Since the cost of switches that are required to connect nodes N is high, it is desirable to reduce the number of switches to have as few as possible. If nodes N are connected in the fat tree structure of FIG. 2B, since multiple paths exist between the nodes N, the performance of the network is good, but the cost is high because a lot of switches are required.

Thereupon, a topological structure of a Latin square fat tree (also referred to as a "finite projective plane fat tree") has been proposed in which a considerable number of nodes can be connected with a lower number of switches compared to the fat tree of FIG. 1B. FIG. 1A illustrates an example of such a Latin square fat tree. Each of the spine switches S is connected with three leaf switches L, but not connected with all the leaf switches L. Therefore, this topological structure requires a lower number of switches to connect nodes N. On the other hand, paths between the nodes N are sparser, and hence, path contention tends to occur when executing a high-load communication process such as all-to-all communication between all nodes N connected with the leaf switches L.

However, it is rare in practice that a single calculation job is allocated to an entire parallel distributed processing system; rather, a part of nodes of the parallel distributed processing system are partially cut out, to feasibly execute a parallel process of a job by all-to-all communication between the group of cut-out nodes.

In the following, a method will be proposed that prevents path contention in all-to-all communication between the group of partially cut-out nodes, by using a topology of a Latin square fat tree in a parallel distributed processing system, and partially cutting out a group of nodes N to submit a job. In the following, all-to-all communication between a group of partially cut-out nodes may be also referred to as "part-to-part communication".

In a method of determining communication protocol according to the embodiment that will be described in the following, to prevent path contention in part-to-part communication, cutting out nodes and scheduling to prevent path contention between the cut-out nodes, are executed. Thus, path contention can be prevented, and time to execute part-to-part communication can be controlled.

[Structure of Finite Projective Plane]

First, a structure of a finite projective plane in the structure of a Latin square fat tree used in the embodiment, will be described. As illustrated in FIG. 3A, if a spine switch $S_L$ is connected with leaf switches $L_A$, $L_B$, and $L_C$ by respective links C, points correspond to the leaf switches $L_A$, $L_B$, and $L_C$, and a line corresponds to the spine switch $S_L$. This replaces the structure of the Latin square fat tree illustrated on the left side of FIG. 3A, with a finite projective plane having a topological structure illustrated on the right side. Similarly, a structure of a Latin square fat tree illustrated on the left side of FIG. 3B is replaced with a finite projective plane illustrated on the right side.

A finite projective plane is a plane that has several points at infinity added, in which no "parallel two lines" exist. For example, in a finite projective plane, lines surely cross at a point at infinity as illustrated in FIG. 3C, and no "parallel two lines" exist. In FIG. 3C, an n-by-n (n=2) lattice structure is formed except at the point at infinity. The lattice structure to be formed is not limited to the n-by-n lattice structure designated by a solid line in FIG. 3C, but may be one of lattice structures designated by two dotted lines in FIG. 3C.

Here, n is a prime number. A finite projective plane of a prime number n is a plane that includes ($n^2+n+1$) points, and ($n^2+n+1$) lines each of which connects (n+1) points among all the points. A circle that connects points in FIG. 3C is also considered as a line. A finite projective plane is specifically defined as follows.

Configuration of Points

One point P is provided.

In addition, n points are provided that are denoted by P(c) where c=0, ... , n−1.

Further, $n^2$ points are provided that are denoted by P(c, r) where c, r=0, ... , n−1.

Configuration of Lines

The number of lines is ($n^2+n+1$), and the same number of points on the lines.

One line is given by L={P,P(0), ... , P(n−1)}.

In addition, there are n lines that are denoted by L(c)={P,P(c, 0), ... , P(c, n−1)} where c=0, ... , n−1.

Further, there are $n^2$ lines that are denoted by L(c, r)={P(c) and P(i, (r+ci)mod n)} where i, c, r=0, ... , n−1.

Constraint

It is necessary that n be a prime number.

Characteristics

The plane is constituted with $n^2+n+1$ points.

$n^2+n+1$ lines exist.

Any two lines cross at a point.

For any two points, one and only one line exists that connects the two points.

A part corresponding to P(c, r) where c, r=0, ... , n−1 is defined as a "lattice part". Points P and P(c) are called "points at infinity", which are cross points of two lines that do not cross in the lattice structure. Thus, a projective plane has a property that any two lines cross.

Next, characteristics of lattice structures in a finite projective plane will be described with reference to FIGS. 4A-4B. FIG. 4A illustrates, in lattice structures of n=5 and n=3 respectively, lines that pass on the lower-left point in different slope directions (slope 0, slope 1, and slope 2), and in the vertical direction. FIG. 4B illustrates that lines having the same slope (slope 1, here) do not cross in the lattice. However, lines having the same slope cross outside of the lattice structure at a point at infinity.

[Structure of Latin Square Fat Tree]

A structure of a Latin square fat tree is obtained by applying the following conversion steps 1-3 to a finite projective plane of n.

1. Have the line L correspond to a spine switch S, and have the point P correspond to a leaf switch L.
2. If and only if the point P exists on the line L, connect the spine switch S with the leaf switch L by a link C.
3. Connect n+1 nodes under the leaf switch L.

Figure 5:
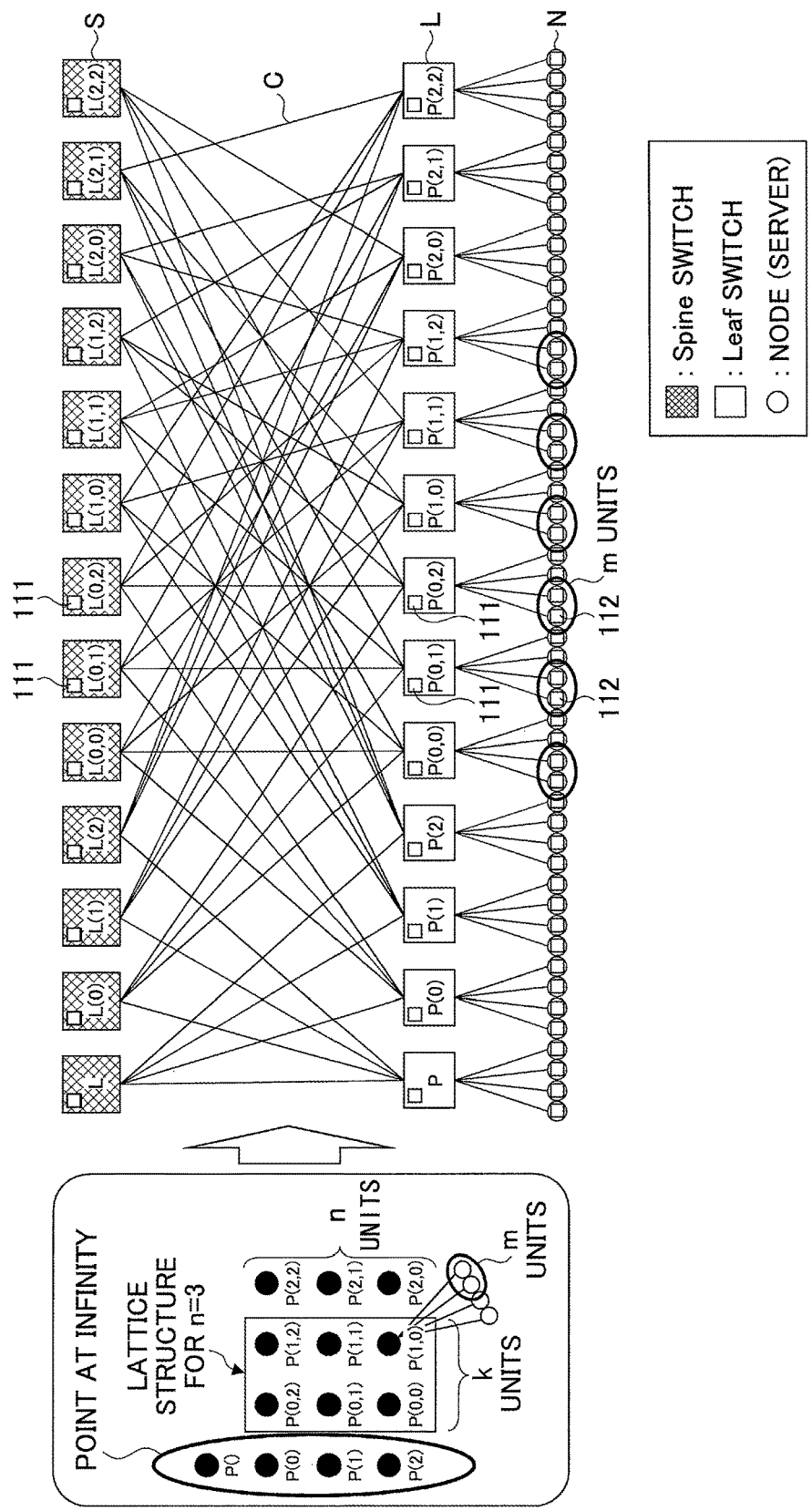
FIG. 5 is a diagram that illustrates features of a lattice structure of a finite projective plane.

The topological structure obtained in this way is defined as the Latin square fat tree. FIG. 5 illustrates a finite projective plane where n=3, and the structure of the corresponding Latin square fat tree.

[Method of Cutting Out Nodes]

In part-to-part communication, nodes in a predetermined range are cut out of nodes of all-to-all communication. When doing so, attention is paid to a part of the lattice structure of the finite projective plane that corresponds to the Latin square fat tree. In the lattice structure of the finite projective plane illustrated on the left side in FIG. 5 (an n-by-n shape where n=3), a rectangle having n by k points (where k may be any natural number) is cut out.

Among nodes under a leaf switch corresponding to the points in the cut-out rectangle, m units of nodes are taken out where m is a natural number that satisfies m≤k. This makes it possible to execute part-to-part communication by the group of switches of n units vertically and k units horizontally in the lattice structure, and m units of nodes among those under each of the switches, namely, by (mnk) units of nodes in total. Here, m and k are integers greater than or equal to one and less than or equal to n, and a relationship of k≥m is satisfied.

In the embodiment, a job can be executed by D units of nodes where D=mnk, m≤k≤n, and n and k are natural numbers, and hence, all-to-all communication between the D units of nodes, namely, the part-to-part communication can be realized. Note that for the sake of description in the following, m units of nodes under each leaf switch are assigned node IDs in the leaf switch, which are 0, 1, 2, . . . , and, m−1, respectively.

[Parallel Information Processing Apparatus]

Every node and switch includes an MPU 111 or a CPU 112. A parallel information processing apparatus 10 that manages part-to-part communication may operate by cooperation of the MPUs 111 in the spine switches S, the MPUs 111 in the leaf switches L, and the CPUs 112 in the m units of nodes N. Alternatively, a parallel information processing apparatus 10 provided out of the switches and nodes, may control part-to-part communication separately from the processors provided in the spine switches S and the like.

Figure 6:
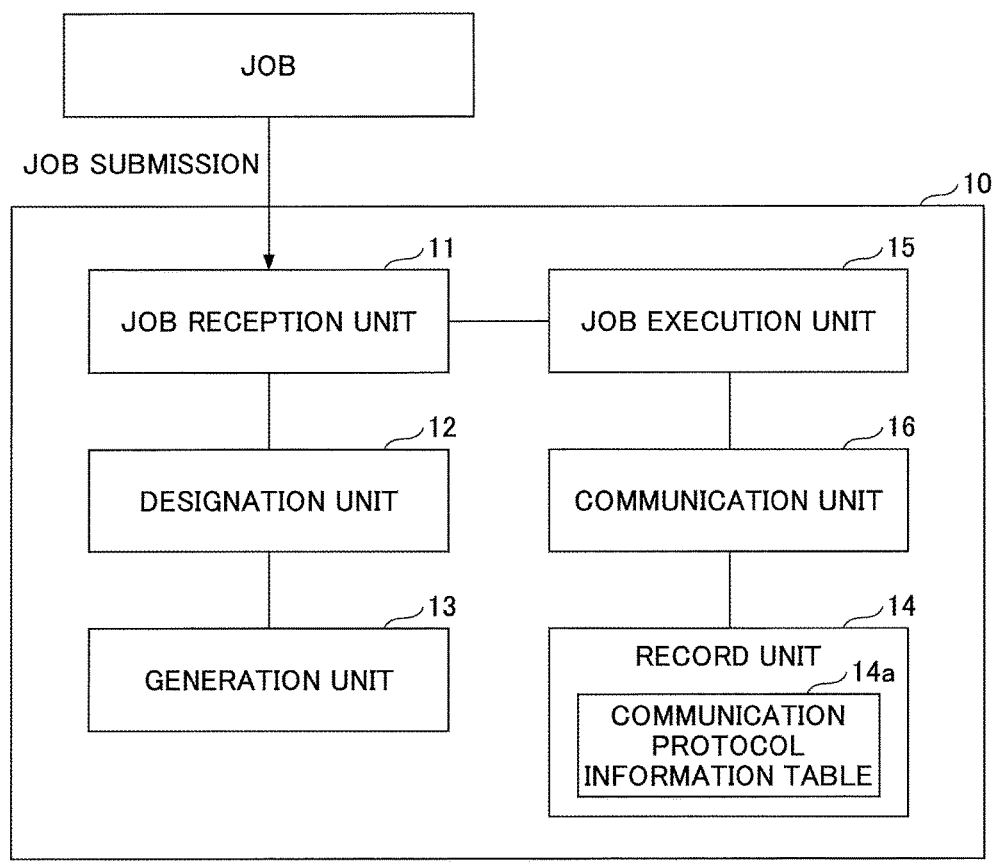
FIG. 6 is a diagram that illustrates a functional configuration of a parallel information processing apparatus according to an embodiment.

Next, an example of a functional configuration of the parallel information processing apparatus 10 according to the embodiment will be described with reference to FIG. 6. The parallel information processing apparatus 10 includes a job reception unit 11, a designation unit 12, a generation unit 13, a record unit 14, a job execution unit 15, and a communication unit 16.

The job reception unit 11 receives information about a job in response to submission of a job by a user. The information about a job includes information about the number of nodes to be used for execution, an execution command, and power required for the parallel processing.

Figure 7:
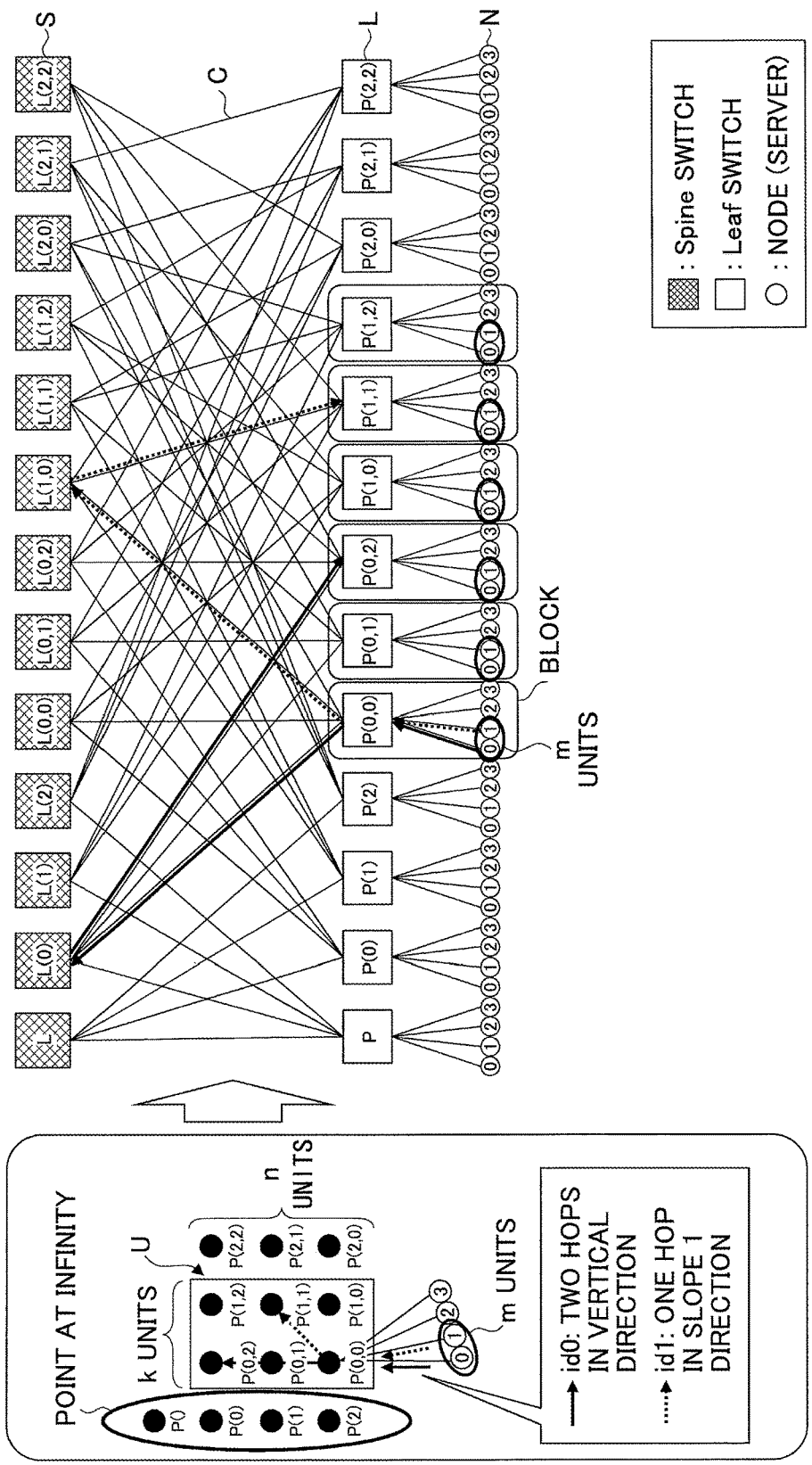
FIG. 7 is a diagram that illustrates an example of the first stage of a scheduling method according to an embodiment.

The designation unit 12 designates nk units of blocks in the group of switches included in the lattice structure in the topology of a Latin square. Here, a "block" refers to a part that is constituted with a leaf switch L and nodes N immediately under the switch. For example, if the designation unit 12 designates nk units of blocks included in the lattice structure in FIG. 7, this means that six blocks included in the structure of a Latin square fat tree in FIG. 7 are designated.

Referring to FIG. 6 again, the generation unit 13 generates information about communication protocol that includes, for the m units of nodes (m≤k) connected with each of the switches corresponding to the designated nk units of blocks, communication directions of different slopes, and the number of hops set for each of the communication directions of the different slopes. The record unit 14 records the information about communication protocol in a communication protocol information table 14a.

The job execution unit 15 executes a job using D units where D=mnk. The communication unit 16 executes part-to-part communication between the nodes N, by executing communication for the m units of nodes N under each leaf switch in the block, based on the information about communication protocol. Thus, a parallel processing job is executed using D units.

[Scheduling Method]

The parallel information processing apparatus 10 executes scheduling to prevent path contention from occurring between the cut-out nodes. Thus, path contention can be prevented, and time to execute part-to-part communication can be controlled.

In the lattice structure illustrated on the left side of FIG. 7, the parallel information processing apparatus 10 executes scheduling for part-to-part communication by mnk units. In the embodiment, part-to-part communication by 12 units where n=3, k=2, and m=2 will be taken as an example. However, k and m may be varied. Thus, the number of nodes and the number of switches to be used for part-to-part communication can be set flexibly, and parallel processing can be performed by using an appropriate number of units for each job.

First, as illustrated in FIG. 7, the parallel information processing apparatus 10 assigns ID numbers of 0, 1 . . . , m−1 sequentially to the m units of nodes immediately under the leaf switch L that participate in the part-to-part communication. As will be described later, nodes having the same ID transmit information in the same line direction (slope) and the same number of hops in each phase.

A transmission path goes through a source node N, a leaf switch L immediately above, a spine switch S, another leaf switch L, and a destination (transmission destination) node N immediately below. In the embodiment, the transmission going through this transmission path is partitioned into two stages.

At the first stage, the parallel information processing apparatus 10 has the information go through a source node N, a leaf switch L immediately above, a spine switch S, and another leaf switch L; namely, transmits the information up to a leaf switch L that manages a block.

At the second stage, the parallel information processing apparatus 10 transmits the information from the leaf switch L managing the block to a destination (transmission destination) node N, namely, from the leaf switch L to a node N immediately below in each of the blocks.

In the transmission at the first stage, for example, a node N of ID0 in the lattice structure illustrated on the left side of FIG. 7 transmits information in the vertical direction by two hops. In this case, in the Latin square fat tree in FIG. 7, the information is transmitted through the node N of ID0, the leaf switch L of P(0, 0), the spine switch S of L(0), and the leaf switch L of P(0, 2).

The node N of ID1 in the lattice structure illustrated on the left side of FIG. 7 transmits the information in the direction having the slope 1 by one hop. In this case, in the Latin square fat tree in FIG. 7, the information is transmitted through the node N of ID1, the leaf switch L of P(0, 0), the spine switch S of L(1, 0), and the leaf switch L of P(1, 1).

Once having determined the slopes and the number of hops for the group of switches in the lattice structure as above, the parallel information processing apparatus 10 can determine communication paths between the nodes via the spine switches S and the leaf switches L.

The m units of nodes N exist immediately below each leaf switch L, and information items from these go through the same leaf switch L. Therefore, to prevent path contention, it is necessary to prevent the information items from going through the same spine switch S. In other words, it is necessary to prevent the information items transmitted by the m units of nodes N, from being transmitted by the same slope. In other words, by transmitting the information items transmitted from the m units of nodes N by different slopes, the information items can be transmitted to the leaf switches L managing the blocks that include the destination nodes N, without going through the same spine switch S, and hence, path contention can be prevented from occurring.

Therefore, the parallel information processing apparatus 10 executes scheduling to determine the slopes and the number of hops for the group of switches so that different slopes are used in each phase. This scheduling is implemented by generating a vector table for mnk units as will be described later.

In the transmission at the second stage, for example, since each of the leaf switches L in the blocks has already received m communication items when the first stage completes, these items are distributed to the nodes N immediately below. This distribution needs m phases.

Note that at the first stage, the m units of nodes N connected with each of the leaf switches L transmit information to the leaf switch L managing the block at the same time. At the second stage, m information items received by each of the leaf switches L are transmitted to the subordinate nodes N cyclically in m phases that constitute a group of phases. For example, in a case of part-to-part communication using mnk units, the number of phases in a group is nk (=mnk/m). Transmission of an item is referred to as a "phase", and m phases that together transmit m items are collectively referred to as a "group of phases".

Figure 8A:
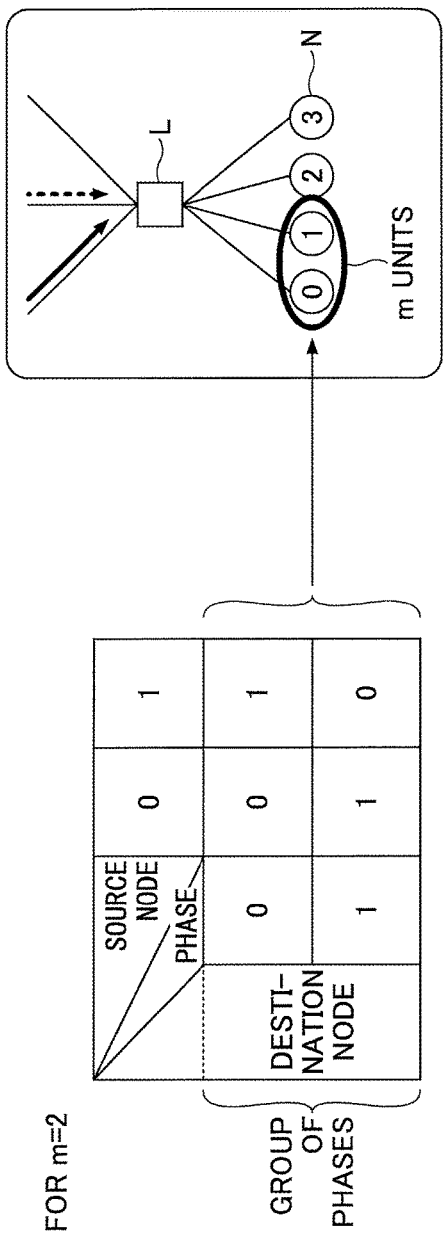
FIGS. 8A-8B are diagrams that illustrate examples of the second stage of a scheduling method according to an embodiment.

At the second stage, transmission to the subordinate nodes is cyclically executed in m phases of a group of phases. For example, FIG. 8A illustrates a case of m=2 where a leaf switch L receives two information items from nodes N of ID0 and ID1 as transmission sources, and transmits the items to a node N as the transmission destination of ID0 and ID1. In this case, the leaf switch L transmits the information to the node N in the block cyclically in two phases. This makes the node N as the transmission destination of ID0 and ID1 receive the two information items from the nodes N of ID0 and ID1 as the transmission sources.

Figure 8B:
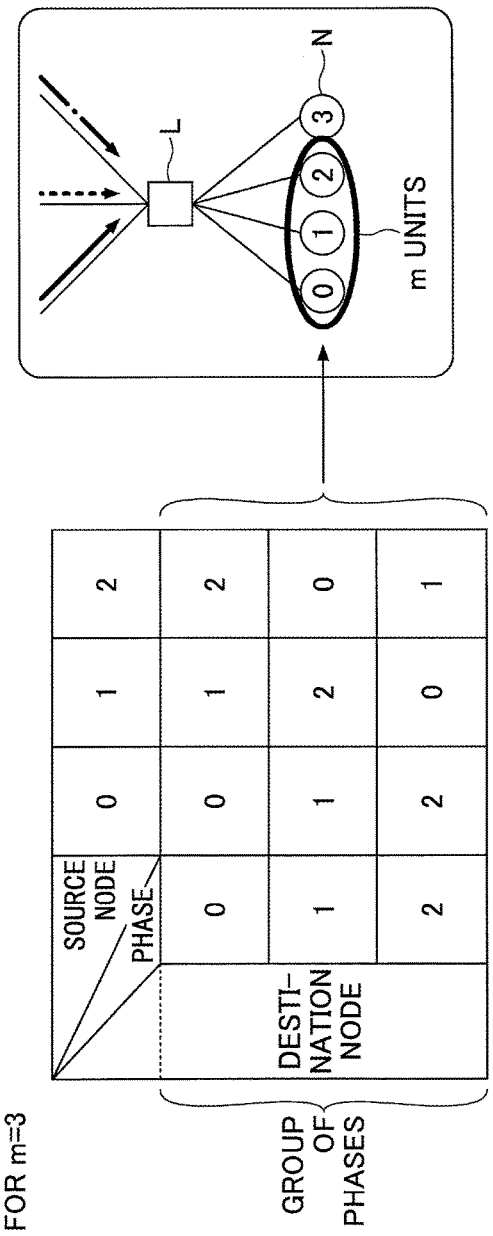

Similarly, FIG. 8B illustrates a case of m=3 where a leaf switch L receives three information items from nodes N of ID0-ID2 as transmission sources, transmits the items to a node N as the transmission destination of ID0-ID2. In this case, the leaf switch L transmits the information to the node N in the block cyclically in three phases. This makes the node N as the transmission destination of ID0-ID2 receive the three information items from the nodes N of ID0-ID2 as transmission sources.

[Generation of Vector Table]

The parallel information processing apparatus 10 generates information about communication protocol according to the embodiment (also referred to as a "vector table", below). In the following, an example of a method of generating a vector table will be described with reference to FIG. 9A to FIG. 12B. Note that generation of the following vector table is executed by the generation unit 13 of the parallel information processing apparatus 10.

As illustrated in FIG. 7, nk units of blocks have been designated among the group of switches included in the lattice structure in the topology of a Latin square. The generation unit 13 generates a vector table that specifies, for each of the m units of nodes N in the designated nk units of blocks, which one of the slopes and the number of hops are to be used for transmission, to generate the table having dimensions of nk (the number of blocks) by m.

In any column (corresponding to a block) in a vector table illustrated in FIG. 9A, duplication of slopes is not allowed. The number of hops is not specifically limited, and may be set with no duplication. The number of slopes is as follows:

the number of any one of slopes 0 to n−1 is (k−1) except for itself;

the number of vertical directions is (n−1) except for itself;

the number of the slope of itself is one (this corresponds to a case of transmitting information to the node of itself); and the total number of slopes is n(k−1)+(n−1)+1=nk. The generation unit 13 generates a vector table so that rows (corresponding to server IDs) of the vector table have slopes written for the following number of slopes, without any field left unwritten. Here, a communication pattern is represented by a specific vector table. FIG. 9B illustrates an example of a vector table for a case of (n, k, m)=(3, 2, 2). As illustrated by an example in FIG. 9B, the vector table is a table for determining a destination leaf switch for each of nodes N that correspond to node IDs of 0 to m−1 under a leaf switch as a transmission source, in each phase of a group of phases.

Node IDs under the leaf switch are arranged in the row direction of the vector table in FIG. 9B, and the group of phases are arranged in the column direction. The vector table specifies destination leaf switches for each node ID under the leaf switch, for the group of phases, by a vector. The vector is defined for every leaf switch as a transmission source, with which corresponding destinations are determined.

Vectors set in the column for node ID0 under the leaf switch are vectors having the vertical slope (n−1 vectors, vertical (1) and vertical (2) in FIG. 9B); vectors having slope S for s=0, 1, . . . , n−1 (k−1 vectors, 0(1), 1(1), 2(1) in FIG. 9B); and, lastly, a zero vector (one vector, "self" that represents the node itself). A digit in parenthesis ( ) in the vector table in FIG. 9B represents the number of hops.

The column for node ID1 under the leaf switch is generated by shifting the column for node ID0 under the leaf switch, by n−1 boxes downwards in the vertical direction. Note that the lower n−1 boxes are moved around upwards. Each of the other columns is generated by shifting the left-adjacent column by n−1 boxes downwards in the vertical direction.

However, the columns in the vector table are not limited to be generated by shifting the respective left-adjacent columns by n−1 boxes downwards in the vertical direction. Since (m−1) (n−1)<nk−(n−1) is satisfied, the vector table may have columns generated by shifting the respective left-adjacent columns by, for example, one of the number of boxes between n−1 and nk−(n−1), downwards in the vertical direction.

In a case of (n, k, m)=(3, 2, 2), communication patterns for all phases that are generated from the communication patterns in the group of phases illustrated in FIG. 8A and the vector table in FIG. 9B may be represented by a table illustrated in FIG. 10. Information about communication protocol in a communication pattern table is recorded in the information about communication protocol table 14a.

Note that the generation unit 13 generates information about communication protocol at time intervals of the phases. The information about communication protocol is recorded in the information about communication protocol table 14a at the time intervals of the phases.

Based on the information about communication protocol generated as above, the communication unit 16 executes communication for each of the m units of nodes that are connected with the leaf switch L, and hence, can execute part-to-part communication between the m units of nodes without path contention.

Figure 11:
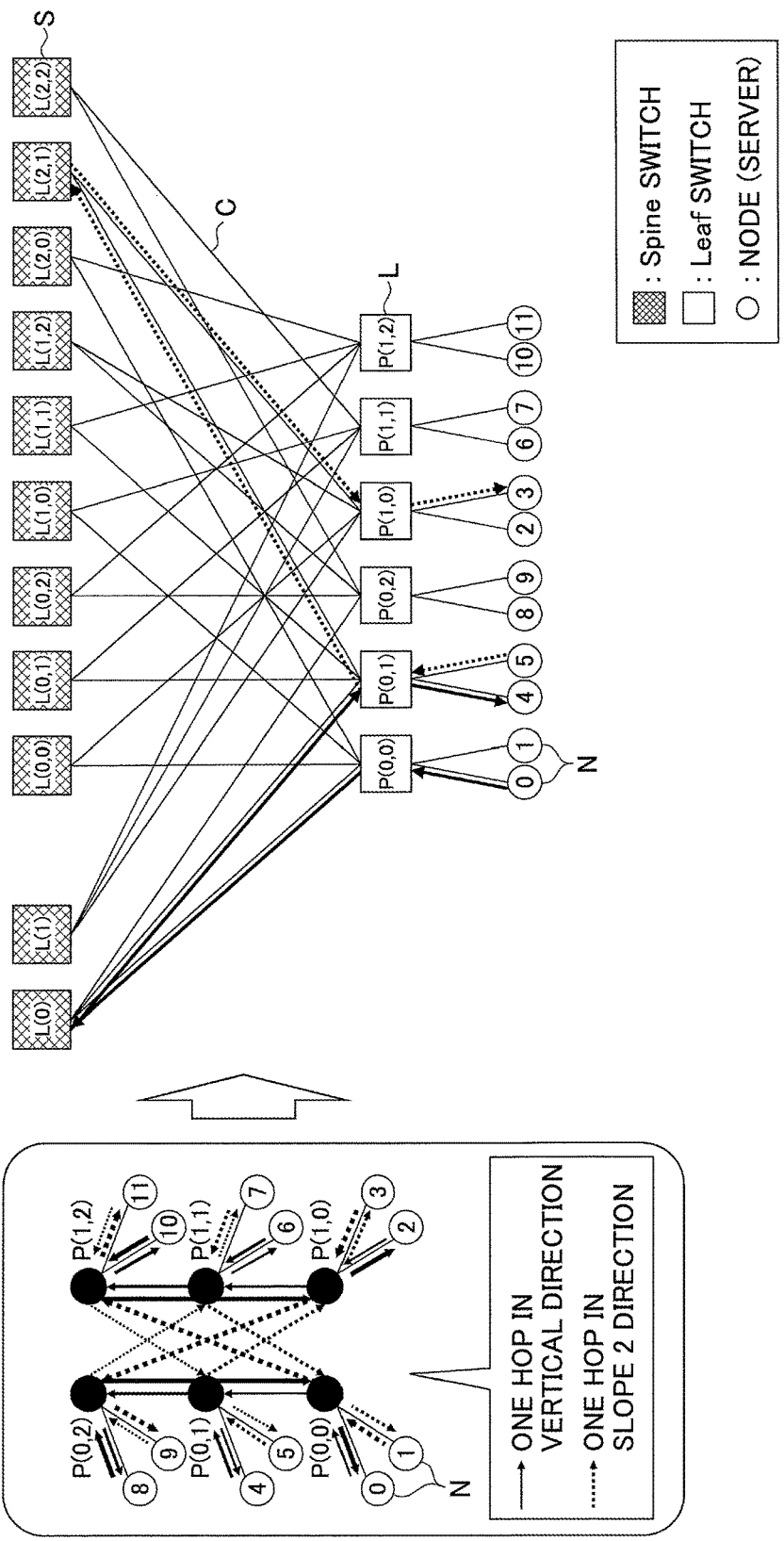
FIG. 11 is a diagram that illustrates an example of communication paths based on information about communication protocol according to an embodiment.

For example, in the zero phase in the zero group of phases, communication is executed as illustrated in FIG. 11. First, a communication path will be described for a node N having the ID of zero. According to the vector table in FIG. 9B, in the zero group of phases, for the node N having the ID of zero under the leaf switch, "vertical (1)" (namely, one hop in the vertical direction) is specified. Therefore, as designated by bold solid lines in FIG. 11, information output from the node N having the ID of zero reaches a leaf switch P(0, 1) via a leaf switch P(0, 0) immediately above. Here, by referring to the case of m=2 in FIG. 8A, communication of the node N having the ID of zero under the source leaf switch is transferred to the node N having the ID of zero under the destination leaf switch, and eventually transferred to the node 4.

In the information about communication protocol illustrated in this communication pattern table, every row and every column have "0" to "11" appeared just once. In other words, it can be seen that part-to-part communication between the cut-out nodes, in which path contention is prevented, is realized. As described above, by the parallel information processing apparatus 10 and the method of determining communication protocol by the parallel information processing apparatus 10 according to the embodiment, path contention is prevented in part-to-part communication between nodes, and hence, time to execute part-to-part communication can be controlled.

[Modified Example of Generation of Vector Table]

A modified example of generation of a vector table will be described with reference to FIG. 12A-12B. In generation of a vector table described above, k and m can be set to arbitrary numbers. In contrast to this, in generation of a vector table according to the modified example, k is limited to be a multiple of m.

In a vector table illustrated in FIG. 12A, in each of the group of phases, the node having the ID of 0 is first assigned transmission in the vertical direction, and the remaining areas are assigned 0, 1, 2, . . . , n−1, and finally, transmission to itself is executed. The table obtained in this way is rotated circularly in the lateral direction to be copied m times. A vector table in FIG. 12B is an example of n=3, k=2, and m=2. In this table, a digit (or a string) appears just once in any row. Therefore, by information about communication protocol generated based on a vector table according to the modified example, part-to-part communication between the cut-out nodes, in which path contention is prevented, is realized.

As described above, by the parallel information processing apparatus 10 and the method of determining communication protocol according to the embodiment and the modified example, collision can be prevented in part-to-part communication between nodes, and path contention can be prevented. This makes it possible to control time to execute part-to-part communication. Also, by using an optimum topological structure in terms of port use efficiency, part-to-part communication can be executed by selecting nodes partially and flexibly while maintaining a low cost.

[Example of Evaluation Results]

Finally, an example of evaluation results will be described with reference to FIG. 13 to FIG. 16. In case n=17, the number of servers connected in the Latin square fat tree structure is 5526. First, a case will be considered in which just a required number of units are cut out. Since there are 114 ways of possible combinations of nodes that can be partially cut out, 2.06% of all units can be cut out in this manner.

Next, a case will be considered in which more than a required number of units are cut out. Here, overhead is defined as a ratio by dividing the number of extra units by the required number of units. For example, consider a case where all-to-all communication with 1,000 units is desired, and all-to-all communication with 1,020 (=17×12×5) units, which is a feasible number of units greater than or equal to 1,000 units, is to be executed. In this case, 2% (20 units) of nodes need to be participating in the all-to-all communication even though they are not really required, which is the overhead.

Figure 13:
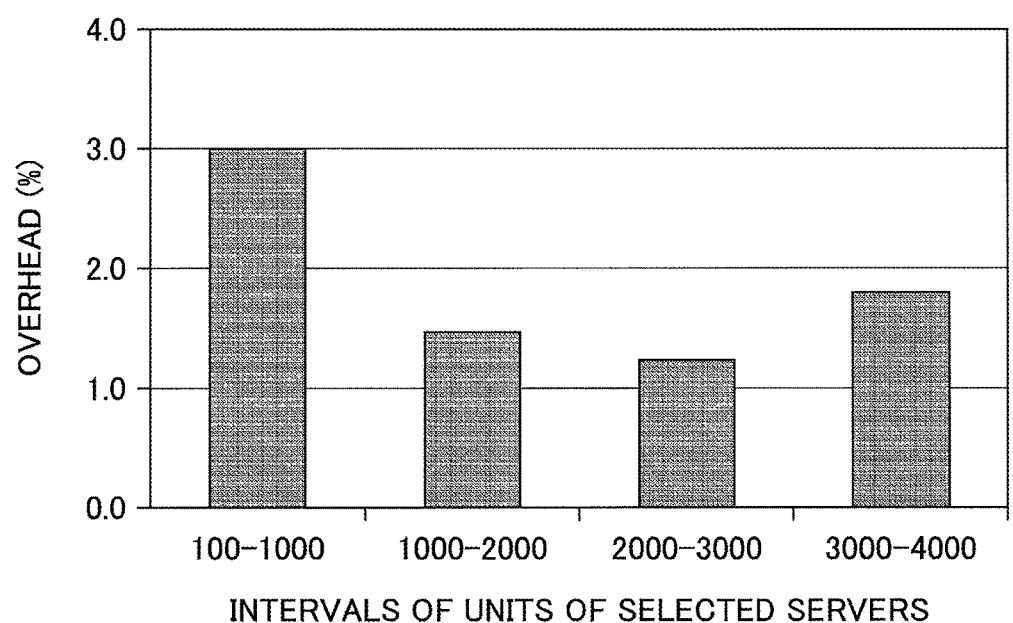
FIG. 13 is a diagram that illustrates an example of a method of determining communication protocol and overhead according to an embodiment.

The average values of overheads in terms of intervals of the numbers of units are illustrated in FIG. 13. In every interval, the average value of overheads is at most 2.96%, which may not be a problem in practice.

Next, evaluation results by simulation will be described. As an evaluation method, for two types of topological structures, which are the fat tree and the Latin square fat tree, throughputs of part-to-part communication by cut-out nodes are measured by simulation, for cases that are characterized by respective degrees and communication patterns (three types). Part-to-part communication means "all-to-all communication between cut-out nodes".

Topologies to be evaluated are the following three types that have respective degrees, parameters (n, m, k) in the Latin square fat tree, and the number of units in the fat tree. The parameters in the Latin square fat tree determines the number of units that participate in all-to-all communication between the cut-out nodes, and this number of units is adjusted to be nearly the same as the number of units in the fat tree. Configurations are illustrated in detail in FIG. 14. The "degree" illustrated in FIG. 14 is the number of ports through which each switch is connected with other switches, and a half of the total number of ports of the switch.

As communication patterns, the following three were used.

1. Shift communication pattern: a shift communication pattern is a communication pattern in which a node having the node number S executes transmission to (S+i)% N in an i-th phase where N is the number of cut-out nodes.
2. Communication pattern according to the embodiment: for this, only the Latin square fat tree was evaluated.
3. Random communication pattern: transmission destinations in transmission phases are random as long as the same node does not transmit to the same destination in different phases.

In a method of calculating a throughput, the "path contention number" is defined for a link as the number of communication items that go through the link at the same time in communication phases. If the path contention number is one, it implies that no path contention is generated on the link. A maximum value of path contention numbers of links through which communication between nodes goes is calculated, and referred to as a "maximum path contention number". A numerical value representing the average of the reciprocals of the maximum path contention numbers is defined as the throughput in a communication phase, and a numerical value representing the average of the throughputs for all phases is defined as the throughput for executing all-to-all communication.

Figure 15:
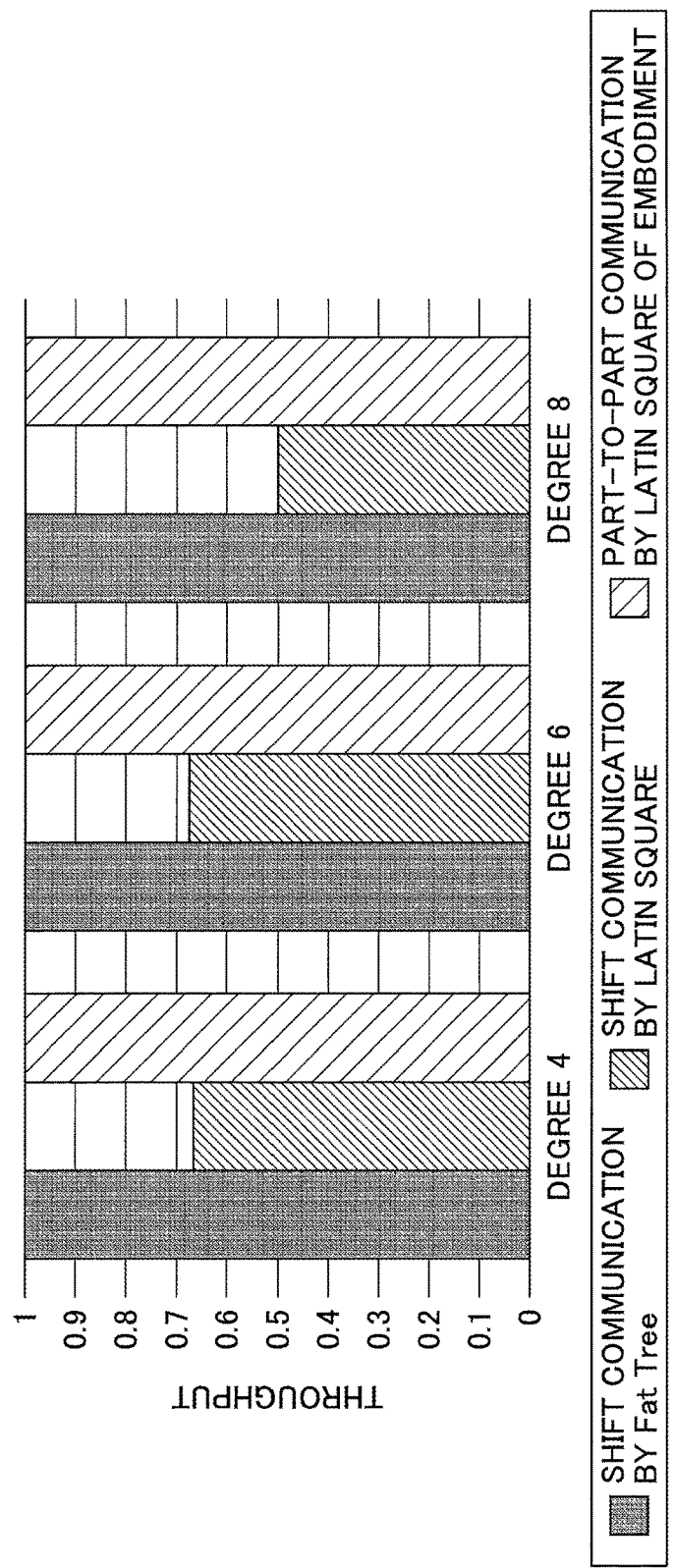
FIG. 15 is a diagram that illustrates an example of evaluation of a method of determining communication protocol according to an embodiment.

Evaluation results are illustrated in FIG. 15. Based on FIG. 15, the throughputs of the shift communication methods by the fat tree and Latin square fat tree are compared with the throughput of the embodiment. The shift communication pattern adopted in the fat tree exhibits the throughput of 1.0, and is capable of communication without contention. In contrast to this, the shift communication pattern adopted in the Latin square fat tree exhibits a decreased throughput, and it can be seen that contention occurs. The communication pattern by the method of determining communication protocol according to the embodiment exhibits the throughput of 1.0. Thus, it is confirmed that "all-to-all communication" between the cut-out nodes can be executed without contention even in the Latin square fat tree.

Figure 16:
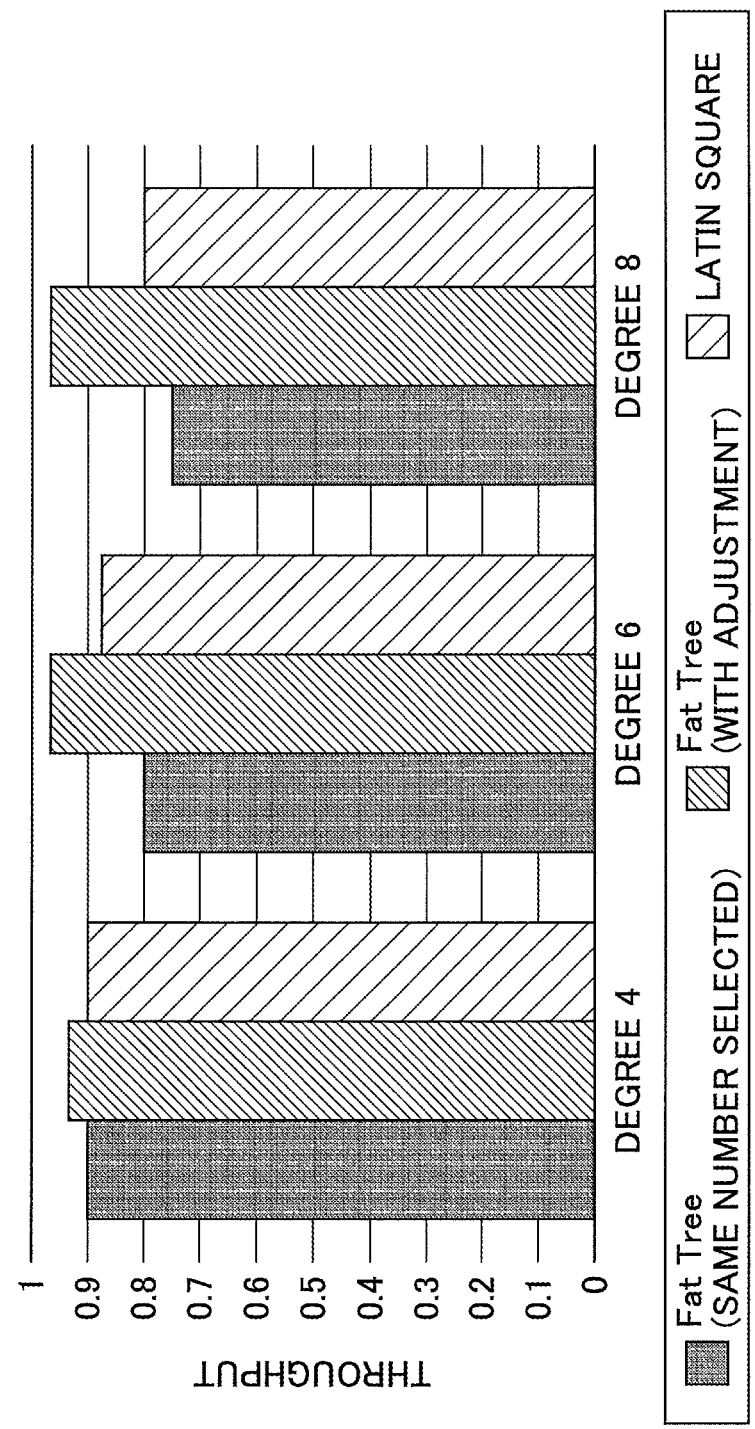
FIG. 16 is a diagram that illustrates an example of evaluation of a method of determining communication protocol according to an embodiment.

The throughputs are compared between the fat tree and the Latin square fat tree by using the random communication pattern. The throughputs are also compared for a case where the ratio of the number of units selected in the fat tree is adjusted to be nearly the same as that in the Latin square fat tree. Referring to FIG. 16, although it can be expected for any of the topological structures to have a certain throughput (about 0.8) by using the random communication pattern, the random communication pattern cannot eliminate contention completely. The performance tends to decrease when the size of the network becomes greater.

When the numbers of nodes are nearly the same, a result was obtained that the fat tree exhibited a worse throughput than the Latin square fat tree. This may be due to the fact that the fat tree has a lower total number of nodes than the Latin square fat tree, and hence, the communication is dense.

When the node selection ratio in the fat tree is adjusted to be nearly the same as the node selection ratio in the Latin square fat tree, a result was obtained that the fat tree had a better throughput.

(Example of Hardware Configuration)

Figure 17:
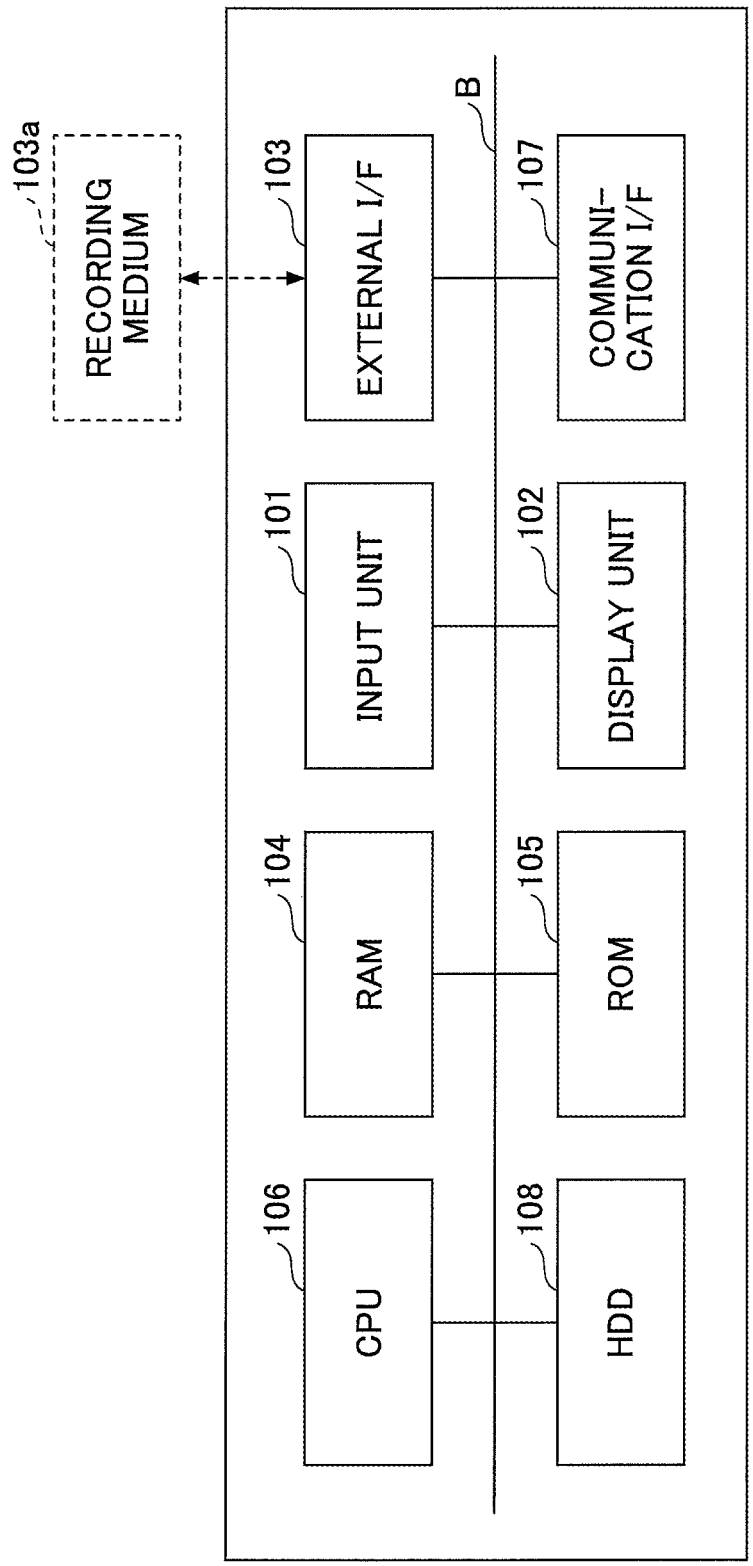
FIG. 17 is a diagram that illustrates an example of a hardware configuration of a parallel information processing apparatus according to an embodiment.

Finally, a hardware configuration of the parallel information processing apparatus 10 according to the embodiment will be described with reference to FIG. 17. The parallel information processing apparatus 10 includes an input unit 101, a display unit 102, an external I/F 103, a RAM (Random Access Memory) 104, a ROM (Read-Only Memory) 105, a CPU (Central Processing Unit) 106, a communication I/F 107, and an HDD (Hard Disk Drive) 108, and these units are mutually connected by a bus B.

The input unit 101 includes a keyboard and a mouse, and is used for inputting operational signals into the parallel information processing apparatus 10. The display unit 102 includes a display, and displays various processed results. The communication I/F 107 is an interface to connect the parallel information processing apparatus 10 with a network. This makes it possible for the parallel information processing apparatus 10 to execute data communication with the group of nodes via the communication I/F 107.

The HDD 108 is a non-volatile storage device to store programs and data. The stored programs and data include basic software that controls the parallel information processing apparatus 10 as a whole, and application software. The HDD 108 may store, for example, programs such as various databases and a node allocation program.

The external I/F 103 is an interface with external devices. The external devices include a recording medium 103a. This makes it possible for the parallel information processing apparatus 10 to execute reads and writes on the recording medium 103a via the external I/F 103. The recording medium 103a may be a CD (Compact Disk), a DVD (Digital Versatile Disk), an SD memory card, a USB memory (Universal Serial Bus memory), or the like.

The ROM 105 is a non-volatile semiconductor memory (a storage device) that can hold stored data even if the power is turned off. The ROM 105 stores programs and data. The RAM 104 is a volatile semiconductor memory (a storage device) that temporarily stores programs and data such as the node allocation program. The CPU 106 reads programs and data such as the node allocation program from the storage devices (for example, the "HDD 108" and the "ROM 105"), to load them on the RAM 104, and to execute a program for determining communication protocol. Thus, parallel processing can be implemented on a parallel information processing apparatus that includes a group of switches configured to have a topology of the Latin square, and nodes connected with switches among the group of switches while preventing contention of communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel information processing apparatus, including a group of switches configured to have a topological structure of a Latin square, and a plurality of nodes that are connected with a switch among the group of switches, the parallel information processing apparatus comprising:
   a memory; and
   a processor configured to
   designate (n×k) units of blocks among switches included in each of lattice structures of a finite projective plane from which the topological structure of the Latin square is obtained,
   generate communication protocol information that includes communication directions having different slopes set for m (m≤k) units of nodes connected with the switches corresponding to the designated (n×k) units of the blocks, and the number of hops set for each of the communication directions having the different slopes, the different slope and the number of hops for each of the communication directions determining a communication path between two of the plurality of nodes via the group of switches, and
   execute communication for the m units of the nodes for each of the (n×k) units of the blocks, based on the communication protocol information, to allow information items from the m units of nodes to be transmitted to switches connected with underlying destination nodes, in accordance with the communication directions having the different slopes and the numbers of hops, without passing through a same spine switch, and execute part-to-part communication between the m units of the nodes for each of the (n×k) units of the blocks.

2. The parallel information processing apparatus as claimed in claim 1, wherein the processor generates the communication protocol information at time intervals of phases.

3. A method of determining communication protocol, executed by a computer, the method comprising:
designating, in a group of switches configured to have a topological structure of a Latin square, and a plurality of nodes that are connected with a switch among the group of switches, (n×k) units of blocks among switches included in each of lattice structures of a finite projective plane from which the topological structure of the Latin square is obtained;
generating communication protocol information that includes communication directions having different slopes set for m (m≤k) units of nodes connected with the switches corresponding to the designated (n×k) units of the blocks, and the number of hops set for each of the communication directions having the different slopes, the different slope and the number of hops for each of the communication directions determining a communication path between two of the plurality of nodes via the group of switches; and
executing communication for the m units of the nodes for each of the (n×k) units of the blocks, based on the communication protocol information, to allow information items from the m units of nodes to be transmitted to switches connected with underlying destination nodes, in accordance with the communication directions having the different slopes and the numbers of hops, without passing through a same spine switch, and execute part-to-part communication between the m units of the nodes for each of the (n×k) units of the blocks.

4. The method of determining communication protocol as claimed in claim 3, wherein the generating includes generating the communication protocol information at time intervals of phases.

5. A non-transitory computer-readable recording medium having a program stored therein for causing a computer to execute a process, the process comprising:
designating, in a group of switches configured to have a topological structure of a Latin square, and a plurality of nodes that are connected with a switch among the group of switches, (n×k) units of blocks among switches included in each of lattice structures of a finite projective plane from which the topological structure of the Latin square is obtained;
generating communication protocol information that includes communication directions having different slopes set for m (m≤k) units of nodes connected with the switches corresponding to the designated (n×k) units of the blocks, and the number of hops set for each of the communication directions having the different slopes, the different slope and the number of hops for each of the communication directions determining a communication path between two of the plurality of nodes via the group of switches; and
executing communication for the m units of the nodes for each of the (n×k) units of the blocks, based on the communication protocol information, to allow information items from the m units of nodes to be transmitted to switches connected with underlying destination nodes, in accordance with the communication directions having the different slopes and the numbers of hops, without passing through a same spine switch, and execute part-to-part communication between the m units of the nodes for each of the (n×k) units of the blocks.

6. The non-transitory computer-readable recording medium as claimed in claim 5, wherein the generating includes generating the communication protocol information at time intervals of phases.

* * * * *